3,565,911
DISUBSTITUTED N-AMINO INDOLINE
COMPOUNDS
Laszlo Beregi, Boulogne, Pierre Hugon, Rueil Malmaison, and Michel Laubie, Vaucresson, France, assignors to Science Union et Cie, Société Francaise de Recherche Medicale, Suresnes, France, a French society
No Drawing. Filed Feb. 25, 1969, Ser. No. 802,208
Claims priority, application Great Britain, Mar. 6, 1968, 10,906/68
Int. Cl. C07d 27/38
U.S. Cl. 260—326.11                 5 Claims

ABSTRACT OF THE DISCLOSURE

N-(3-sulfamyl-4-chloro-benzamido) indolines substituted in 2-position by (a) lower-alkyl having up to five carbon atoms, inclusive, (b) phenyl, halophenyl, trifluoromethylphenyl, lower-alkylphenyl, or lower-alkyloxyphenyl, or (c) cyclohexyl.

These compounds possess diuretic and antihypertensive properties.

---

The present invention provides substituted N-amino indoline compounds of the general formula

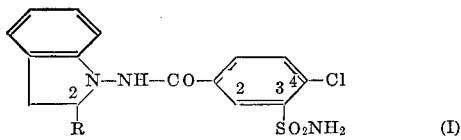

wherein R represents a substituent selected from the group consisting of:

(a) lower-alkyl containing 1 to 5 carbon atoms inclusive,
(b) phenyl, phenyl substituted by one or more substituents selected from the group consisting of halogen, trifluoromethyl, and lower-alkyl and lower-alkyloxy having one to four carbon atoms inclusive in the lower-alkyl group, and
(c) cyclohexyl.

The substituted N-amino indoline compounds of the present invention may be prepared by reacting the appropriate N-amino indoline of the general formula:

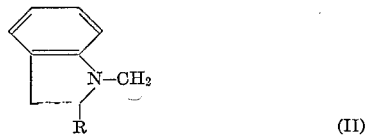

wherein R has the meaning given above, with 3-sulfamyl-4-chlorobenzoyl chloride of the formula:

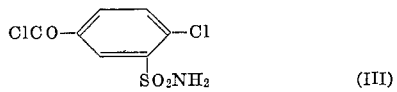

The N-amino indolines used as starting material may be prepared according to the process of J. B. Wright and R. E. Willette, J. Med. and Pharm. Chem. 5.811 (1962), which involves nitrosating an indoline, and reducing the resulting N-nitroso derivative with lithium aluminium hydride.

The new compounds may be prepared in the form of their optically active $d$-(+) and $l$-(—) isomers which are therefore included in the present invention.

The following examples illustrate the invention, the parts being by weight and the melting points being determined on a Kofler heater plates under the microscope (M.K.) or on a Kofler Bank (K).

EXAMPLE 1

N-(3-sulfamyl-4-chloro-benzamido)-2-methyl indoline

A total of 8.9 parts of 3-sulfamyl-4-chloro-benzoyl chloride in a solution of 50 parts of anhydrous tetrahydrofuran are added portionwise in the course of 60 minutes, while stirring, to a solution of 5.2 parts of N-amino-2-methyl indoline and 3.5 parts of triethylamine in 150 parts of anhydrous tetrahydrofuran.

The reaction mixture is left to stand 3 hours at room temperature, then the precipitated chlorhydrate of triethylamine is filtered off. The filtrate is evaporated under vacuum and the residue is crystallized from a solution of 60 parts of isopropanol in 75 parts of water.

There are obtained 9 parts of N-(3-sulfamyl-4-chloro-benzamido)-2-methyl indoline. M.P. (K) 184–186° C., M.P. (M.K.) 160–162° C. (isopropanol/water).

EXAMPLES 2–4

The following compounds are prepared by the method of Example 1 using the corresponding N-amino indoline compounds:

(2) N-(3-sulfamyl-4-chloro-benzamido)-2-propyl indoline. M.P. (K) 160° C., M.P. (M.K.) 119–121° C. (ethanol/water), starting from 3-sulfamyl-4-chloro-benzoyl chloride and N-amino-2-propyl indoline.

In addition, other N-(3-sulfamyl-4-chloro-benzamido)-2-lower-alkyl indolines, wherein the 2-lower-alkyl radical contains 1 to 5 carbon atoms inclusive, for example, the 2-ethyl, 2-isopropyl, 2-butyl, 2-sec. butyl, and 2-amyl indoline compounds are prepared in exactly the same manner, starting from 3-sulfamyl-4-chloro-benzoyl chloride and the corresponding N-amino-2-lower-alkyl indoline.

(3) N-(3-sulfamyl-4-chloro-benzamido) - 2 - phenyl indoline, starting from 3-sulfamyl-4-chloro-benzoyl chloride and N-amino-2-phenyl indoline.

In the same manner, starting from 3-sulfamyl-4-chloro-benzoyl chloride and the appropriate N-amino-2-substituted phenyl indoline, the following N-(3-sulfamyl-4-chloro-benzamido)-2-substituted phenyl indolines are prepared:

N-(3-sulfamyl-4-chloro-benzamido)-2-(p-methoxyphenyl) indoline,
N-(3-sulfamyl-4-chloro-benzamido)-2-(p-tolyl) indoline,
N-(3-sulfamyl-4-chloro-benzamido)-2-(p-chlorophenyl) indoline,
N-(3-sulfamyl-4-chloro-benzamido)-2-(p-bromophenyl) indoline,
N-(3-sulfamyl-4-chloro-benzamido)-2-(p-fluorophenyl) indoline,
N-(3-sulfamyl-4-chloro-benzamido)-2-(2',6'-dimethylphenyl) indoline,
N-(3-sulfamyl-4-chloro-benzamido)-2-(m-bromo-p-chlorophenyl) indoline,
N-(3-sulfamyl-4-chloro-benzamido)-2-(2',6'-dichlorophenyl) indoline,
N-(3-sulfamyl-4-chloro-benzamido)-2-(3'-chloro-5'-methylphenyl) indoline, and
N-(3-sulfamyl-4-chloro-benzamido)-2-(p-trifluoromethylphenyl) indoline.

(4) N-(3-sulfamyl-4-chloro-benzamido)-2-cyclohexyl indoline. M.P. (K) 199–200° C. starting from 3-sulfamyl-4-chloro-benzoyl chloride and N-amino-2-cyclohexyl indoline.

The new compounds of the present invention possess valuable pharmacological and therapeutic properties, especially diuretic and antihypertensive properties.

Their toxicity is very low. The $LD_{50}$ determined in mice by the method of Litchfield, J. T. and Wilcoxon, J. F. [J. Pharmacol. 97, 99 (1949)] varies from >2 g./kg. to >3 g./kg. per oral route and from 400 mg./kg. to 600 mg./kg. per intraperitoneal route.

Studied in dogs and rats the compounds of the invention show an important diuretic activity either administered perorally as well as intravenously, with a duration more than 12 hours. An increase is especially observed in water, chlorine and sodium elimination, without notable increase in potassium elimination.

As an example, the hereinafter table shows the results obtained by oral administration of 300 γ/kg. of N-(3-sulfamyl-4-chloro-benzamido)-2-methyl indoline of Example 1 (S 1520):

| Parameters | Control | S 1520: 300 γ/kg. per os, medium 6 dogs | | | | | |
|---|---|---|---|---|---|---|---|
| | | 1 h. | 2 h. | 3 h. | 4 h. | 5 h. | 6 h. |
| Urinary volume (ml./min.) | 3.18 | 4.94 | 5.12 | 5.16 | 5.40 | 5.70 | 5.15 |
| Urinary pH | 6.7 | 6.3 | 5.9 | 6.1 | 6.1 | 6.2 | 6.3 |
| Urinary Na+(meq./l.) | 5.2 | 15.5 | 22.2 | 22.9 | 23.9 | 21.2 | 20.4 |
| Urinary K+(meq./l.) | 8.1 | 7.9 | 8.2 | 7.6 | 7.4 | 7.3 | 6.2 |
| Urinary Cl-(meq./l.) | 3 | 16.6 | 26.4 | 26 | 25 | 25.1 | 20.2 |
| Urinary CO²(meq./l.) | 3.4 | 3.2 | 1.8 | 2.1 | 2.5 | 2.8 | 3.4 |
| Excretion of Na+(μeq./min.) | 11.9 | 76 | 113 | 121 | 124 | 116 | 114 |
| Excretion of K-(μeq./min.) | 22 | 39 | 42 | 38 | 38 | 37 | 31 |
| Excretion Cl-(μeq./min.) | 9 | 83 | 135 | 134 | 134 | 132 | 107 |
| Excretion CO²(μeq./min.) | 8 | 15 | 9 | 11 | 15 | 16 | 19 |

The same compound does not modify notably the blood pressure of normal animals, but decreases the blood pressure of dogs with experimental hypertension from 20 to 40 mm. Hg.

Administered to men at doses of 40 to 60 mg. orally, the compound S 1520 increases the urinary volume from 137 to 206%, the chlorine elimination from 157 to 284%, the sodium elimination from 172 to 252%, and the potassium elimination only from 39 to 73% during the 24 hours following intake of the product.

Thus the new derivatives may be used successfully in the treatment of diseases with hydroelectrolytic retention, especially in the treatment of oedema or ascites (due to cardiac, renal or hepatic insufficiency), hypertension, or obesity.

The compounds may be administered by the oral, rectal, or parenteral route in the form of tablets, dragées, capsules, suppositories or injections, in admixture or conjunction with pharmaceutically suitable carriers, such, for example, as distilled water, glucose, lactose, starch, Mg stearate, ethylcellulose, and cacaobutter. The doses may vary from 10 to 100 mg./day.

Various modifications may be made in the compounds, compositions, methods, and procedures of the present invention without departing from the spirit or scope thereof, as obvious modifications and equivalents will be apparent to one skilled in the art, for which reason it is to be understood that the invention is not limited to the exact details of operation or exact compounds or compositions or methods or procedures shown and described.

What we claim is:

1. A compound selected from the group consisting of N-amino indolines of the Formula I

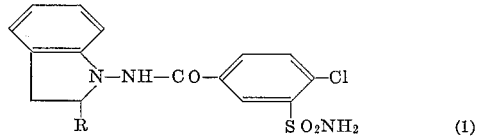

wherein R is selected from the group consisting of (a) lower-alkyl having up to five carbon atoms inclusive,
(b) phenyl, halophenyl, trifluoromethylphenyl, lower-alkylphenyl and lower-alkyloxyphenyl having up to four carbon atoms in the lower-alkyl group, and
(c) cyclohexyl, racemic mixtures thereof, and optical isomers thereof.

2. A compound of claim 1 which is N-(3-sulfamyl-4-chloro-benzamido)-2-methyl indoline.

3. A compound of claim 1 which is N-(3-sulfamyl-4-chloro-benzamido)-2-propyl indoline.

4. A compound of claim 1 which is N-(3-sulfamyl-4-chloro-benzamido)-2-cyclohexyl indoline.

5. A compound of claim 1 which is N-(3-sulfamyl-4-chloro-benzamido)-2-phenyl indoline.

References Cited

UNITED STATES PATENTS 3,083,207  3/1963  Hoehn et al.

ALEX MAZEL, Primary Examiner

J. A. NARCAVAGE, Assistant Examiner

U.S. Cl. X.R.

424—274

SU-34

UNITED STATES PATENT OFFICE
CERTIFICATE OF CORRECTION

Patent No. 3,565,911              Dated February 23, 1971

Inventor(s) Laszlo Beregi et al.

It is certified that error appears in the above-identified patent and that said Letters Patent are hereby corrected as shown below:

Column 3, line 27                     -- K- --
Application Page 3, line 27                         should read
                                 " K+ "

Signed and sealed this 15th day of June 1971.

(SEAL)
 Attest:

EDWARD M. FLETCHER, JR.                    WILLIAM E. SCHUYLER,
Attesting Officer                          Commissioner of Patents